United States Patent
Kamotani et al.

(10) Patent No.: US 10,965,876 B2
(45) Date of Patent: Mar. 30, 2021

(54) IMAGING SYSTEM, IMAGING METHOD, AND NOT-TRANSITORY RECORDING MEDIUM

(71) Applicant: Panasonic Intellectual Property Management Co., Ltd., Osaka (JP)

(72) Inventors: Yusuke Kamotani, Osaka (JP); Yoshifumi Kawaguchi, Kyoto (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 16/865,474

(22) Filed: May 4, 2020

(65) Prior Publication Data
US 2020/0322539 A1    Oct. 8, 2020

Related U.S. Application Data

(63) Continuation of application No. PCT/JP2018/036627, filed on Oct. 1, 2018.

(30) Foreign Application Priority Data

Nov. 8, 2017    (JP) .............................. JP2017-215863

(51) Int. Cl.
*H04N 5/232*    (2006.01)
(52) U.S. Cl.
CPC ..... *H04N 5/23299* (2018.08); *H04N 5/23219* (2013.01); *H04N 5/23296* (2013.01)
(58) Field of Classification Search
CPC ............... H04N 5/232; H04N 5/23219; H04N 5/23296; H04N 5/23299; G03B 15/00;
(Continued)

(56) References Cited

U.S. PATENT DOCUMENTS 7,433,588 B2 * 10/2008 Oya ........................ G06T 7/254
                                                                396/153
9,282,230 B2 *  3/2016 Takashima ......... H04N 5/23299
(Continued)

FOREIGN PATENT DOCUMENTS

JP          2866183 B2     3/1999
JP     2006-270274 A    10/2006
(Continued)

OTHER PUBLICATIONS

International Search Report for corresponding Application No. PCT/JP2018/036627, dated Nov. 27, 2018.

*Primary Examiner* — Chiawei Chen
(74) *Attorney, Agent, or Firm* — Renner, Otto, Boisselle & Sklar, LLP

(57) ABSTRACT

An imaging system includes: a transmitter that is attached to an object and wirelessly transmits a positioning signal; a positioning device that determines the position of the object based on the positioning signal; an imaging device that images the object in a variable direction and at a variable magnification; and a control device. The control device calculates a direction and a distance from the imaging device to the object based on the position of the object, and sets a first direction and a first magnification on the imaging device based on the calculated direction and distance. Then, the control device sets a second direction and a second magnification on the imaging device based on imaging data generated by imaging the object, the imaging data being generated by the imaging device on which the first direction and the first magnification are set.

8 Claims, 5 Drawing Sheets

(58) Field of Classification Search
CPC .......... G03B 17/00; G03B 17/02; G01S 5/04;
G01S 5/14
See application file for complete search history.

(56) References Cited

U.S. PATENT DOCUMENTS

| | | | |
|---|---|---|---|
| 10,529,205 B2* | 1/2020 | Arai | G08B 13/19602 |
| 2006/0253416 A1 | 11/2006 | Takatsu | |
| 2009/0028386 A1 | 1/2009 | Michimoto | |
| 2010/0007751 A1* | 1/2010 | Icho | H04N 5/23258 |
| | | | 348/222.1 |
| 2011/0276985 A1 | 11/2011 | Takatsu | |
| 2011/0286010 A1* | 11/2011 | Kusik | G01D 5/34 |
| | | | 356/614 |
| 2012/0117514 A1* | 5/2012 | Kim | G06F 3/011 |
| | | | 715/849 |
| 2012/0169899 A1* | 7/2012 | Chugh | H04N 21/4223 |
| | | | 348/231.4 |
| 2012/0272251 A1 | 10/2012 | Takatsu | |
| 2015/0320343 A1* | 11/2015 | Utsunomiya | A61B 5/4824 |
| | | | 600/595 |
| 2016/0189391 A1* | 6/2016 | Demartin | H04N 5/23296 |
| | | | 382/103 |
| 2019/0026071 A1* | 1/2019 | Tamaoki | A63F 13/54 |
| 2019/0098206 A1* | 3/2019 | Hong | H04N 5/23296 |

FOREIGN PATENT DOCUMENTS

| | | |
|---|---|---|
| JP | 2010-130590 A | 6/2010 |
| JP | 4603391 B2 | 10/2010 |
| JP | 2016-212465 A | 12/2016 |
| WO | 2007/088856 A1 | 8/2007 |

* cited by examiner

IMAGING SYSTEM, IMAGING METHOD, AND NOT-TRANSITORY RECORDING MEDIUM

TECHNICAL FIELD

The present disclosure relates to an imaging system, an imaging method, and a program for imaging at least one movable object.

BACKGROUND ART

There is an imaging system that controls the azimuth angle (pan), the elevation angle (tilt), and the magnification (zoom) of a camera to image an object, which is the subject of the image, while automatically tracking the object. For example, according to the invention disclosed in PTL 1, an image taken by a camera is analyzed to detect an object from the image, and the camera is controlled on the basis of the detection result. In cases where a camera is used to image only one speaker who moves little or only slowly under constant light conditions such as a speaker giving a lecture or class, an imaging system according to conventional arts is capable of positioning the speaker in the center of the imaging range of the camera (that is, the entire field of view of the camera) to take an image of the speaker.

CITATION LIST

Patent Literature

PTL 1: International Publication No. WO 2007/088856

SUMMARY

An imaging system that tracks an object through image analysis is effective when imaging only a single object that moves little or only slowly under constant light conditions as described above. However, such imaging system may fail to track the object when imaging a performance involving vigorous movement (such as a concert, a dance, a play, or the like), sports, races, and the like as in the examples below.

(1) When a plurality of objects (singers, actors, players, or the like) is present in the imaging range of a camera, and two or more of the objects overlap as seen from the camera.

(2) When an image analysis fails because of, for example, fast movement of the object.

(3) When the object goes out of the imaging range of the camera because of fast movement of the object, or when the object goes out of sight of the camera because of, for example, being hidden by an obstacle.

(4) When the luminance and/or color of a light significantly changes for the purpose of, for example, staging effects.

Therefore, there is a desire to reliably track and image an object when a plurality of objects is present, when an object is moving fast, and/or when light conditions significantly change, or in similar cases.

An object of the present disclosure is to provide an imaging system, an imaging method, and a program that make it possible to track and image an object reliably as compared with conventional arts.

According to an aspect of the present disclosure, an imaging system for imaging a movable object includes a transmitter, a positioning device, an imaging device, and a control device. The transmitter is attached to the object and wirelessly transmits a positioning signal. The positioning device receives the positioning signal and determines the position of the object based on the positioning signal. The imaging device images the object in a variable direction and at a variable magnification. The control device controls the variable direction and the variable magnification of the imaging device. The control device calculates a direction and a distance from the imaging device to the object on the basis of the position of the object as determined by the positioning device. The control device sets a first direction and a first magnification on the imaging device on the basis of the calculated direction and distance. The control device sets a second direction and a second magnification on the imaging device on the basis of imaging data generated by imaging the object, the imaging data being generated by the imaging device on which the first direction and the first magnification are set.

An imaging system according to an aspect of the present disclosure is capable of tracking and imaging an object reliably as compared with conventional arts by referring to the position of the object determined by the positioning device and to the content of imaging data.

DESCRIPTION OF EMBODIMENTS

An exemplary embodiment will now be described in detail with reference to the drawings as appropriate. However, an unnecessarily detailed description may be omitted. For example, a detailed description of a well-known item or a redundant description of substantially the same configuration may be omitted. This is for preventing the following description from being unnecessarily redundant and for ease of understanding by those skilled in the art.

Note that the present inventor(s) provide the accompanying drawings and the following description for those skilled in the art to fully understand the present disclosure, but do not intend that the subject matter described in the claims is limited to these drawings and description.

Exemplary Embodiment

An imaging system according to an exemplary embodiment will now be described with reference to FIGS. 1 to 9.

[1-1. Configuration]

Figure 1:
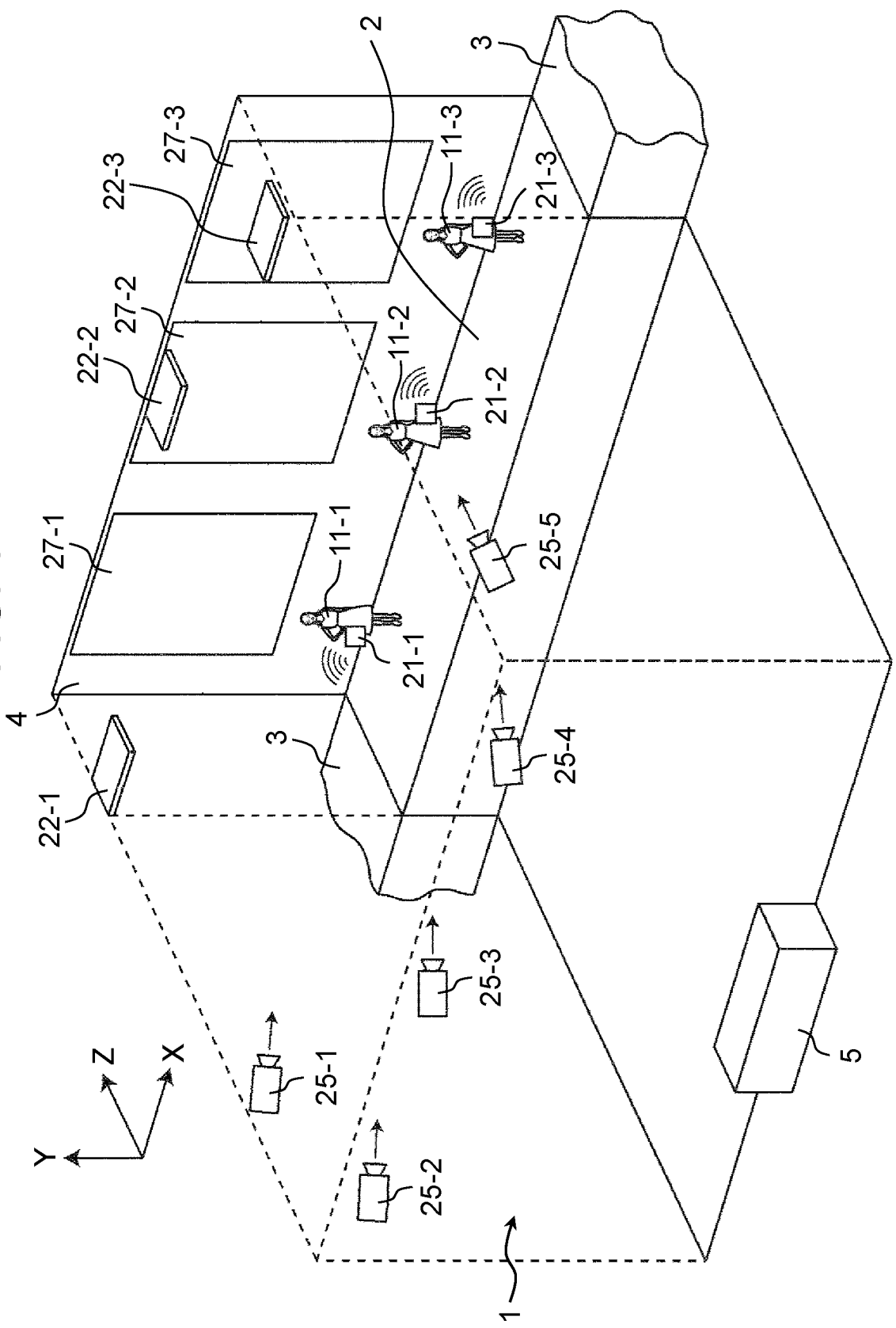
FIG. 1 is a schematic diagram illustrating concert hall 1 provided with an imaging system according to an exemplary embodiment.

FIG. 1 is a schematic diagram illustrating concert hall 1 provided with the imaging system according to the exemplary embodiment. Concert hall 1 includes stage 2, stage wing 3, and wall 4. In FIG. 1, walls other than the wall behind stage 2 and the ceiling are omitted for convenience of illustration.

On stage 2, a plurality of movable objects 11-1 to 11-3 is present. These objects 11-1 to 11-3 may be collectively referred to as "object 11". In the example in FIG. 1, each object 11 is a performer in, for example, a concert or a play, and is hereinafter referred to as "target person 11".

In concert hall 1, there is further disposed the imaging system including console 5, beacon devices 21-1 to 21-3, receivers 22-1 to 22-3, cameras 25-1 to 25-5, and display devices 27-1 to 27-3. With this imaging system, each target person 11 moving on stage 2 is tracked and imaged.

Figure 2:
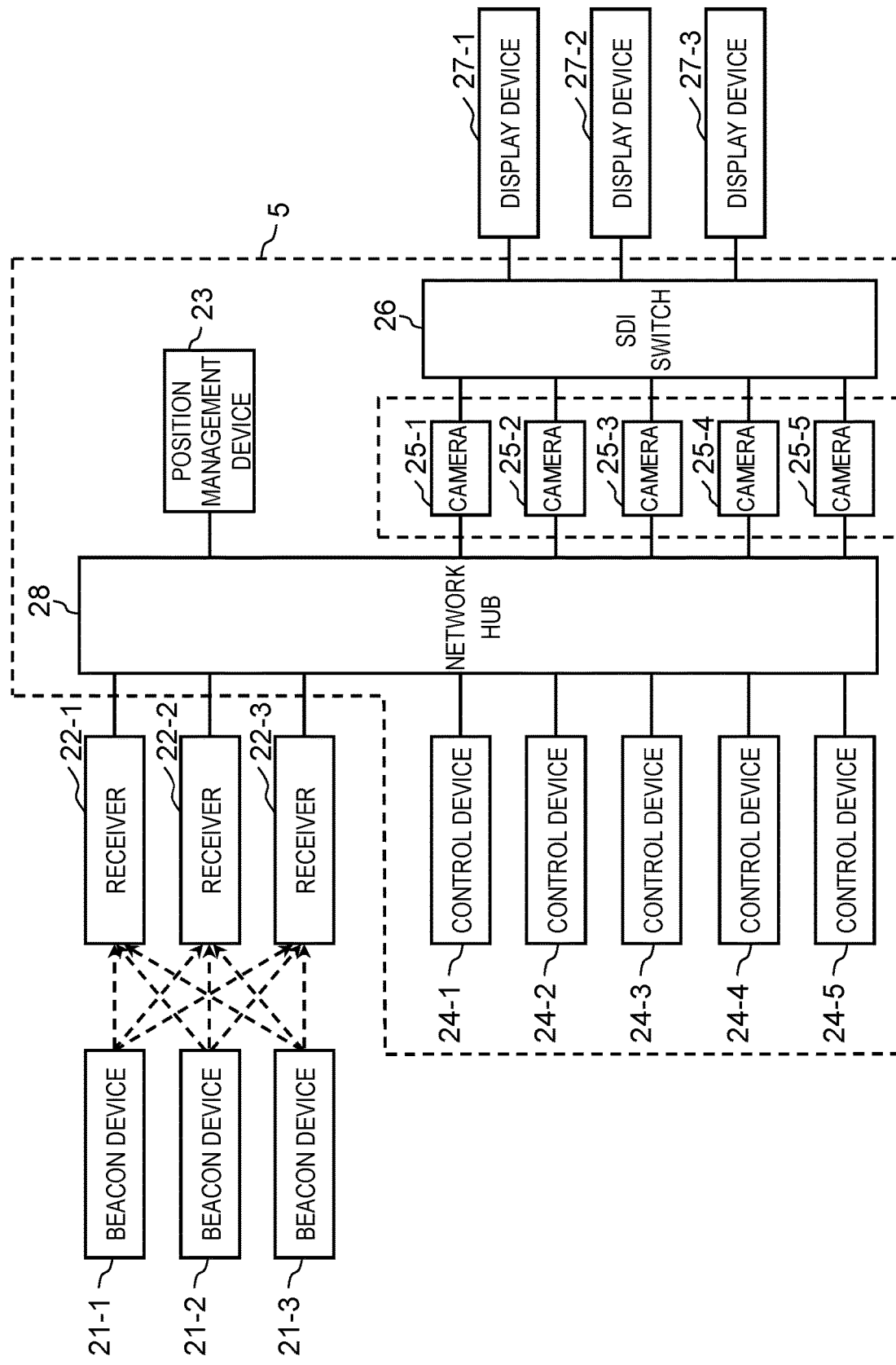
FIG. 2 is a block diagram illustrating a configuration of the imaging system according to the exemplary embodiment.

FIG. 2 is a block diagram illustrating a configuration of the imaging system according to the exemplary embodiment. Console 5 includes position management device 23, control devices 24-1 to 24-5, serial digital interface (SDI) switch 26, and network hub 28. Beacon devices 21-1 to 21-3 are wirelessly connected to receivers 22-1 to 22-3. Receivers 22-1 to 22-3, position management device 23, control devices 24-1 to 24-5, and cameras 25-1 to 25-5 are connected to one another via a local area network (LAN) including network hub 28. Output terminals on cameras 25-1 to 25-5 are connected to SDI switch 26 via SDI cables. Input terminals on display devices 27-1 to 27-3 are also connected to SDI switch 26 via the SDI cables.

As illustrated in FIG. 1, beacon devices 21-1 to 21-3 are attached to target persons 11-1 to 11-3, respectively. These beacon devices 21-1 to 21-3 may be collectively referred to as "beacon device 21". Each beacon device 21 wirelessly transmits a positioning signal for determining the position of corresponding target person 11. Each beacon device 21 wirelessly transmits a non-directional beacon signal as the positioning signal to receivers 22-1 to 22-3 in accordance with, for example, the Bluetooth (registered trademark) Low Energy (BLE) standard. Each beacon device 21 is assigned with an identifier associated with corresponding target person 11. Each positioning signal includes the identifier of beacon device 21 that transmits the positioning signal. Each beacon device 21 can be produced so as to have a maximum dimension of, for example, 2 cm to 3 cm. However, for convenience of illustration, FIG. 1 and others show each beacon device 21 in a size larger than the actual size relative to the body size of each target person 11.

Receivers 22-1 to 22-3 are attached on, for example, a wall or a ceiling of concert hall 1 at different positions. These receivers 22-1 to 22-3 may be collectively referred to as "receiver 22". Each receiver 22 receives a positioning signal transmitted by each beacon device 21. Here, the positioning signal transmitted by single beacon device 21 is received by a plurality of receivers 22. Each receiver 22 measures, for example, the radio wave intensity or the direction of arrival of the positioning signal. Each receiver 22 sends the result of measuring the positioning signal to position management device 23 via the LAN.

Position management device 23 determines the position of each target person 11 (that is, corresponding beacon device 21) on the basis of the result of measuring the positioning signal as obtained by each receiver 22. In the case where each receiver 22 measures the radio wave intensity of the positioning signal, position management device 23 determines the position of each beacon device 21 in a three-dimensional space, on the basis of the radio wave intensity of the positioning signal transmitted by single beacon device 21 and received by at least three receivers 22. In the case where each receiver 22 measures the direction of arrival of the positioning signal, position management device 23 determines the position of each beacon device 21 in a three-dimensional space, on the basis of the direction of arrival of the positioning signal transmitted by single beacon device 21 and received by at least two receivers 22. Position management device 23 sends the identifier and the position of each beacon device 21 to control devices 24-1 to 24-5 via the LAN.

Position management device 23 may be, for example, a general-purpose personal computer or a dedicated device for determining the position of each target person 11.

Control devices 24-1 to 24-5 each execute a camera control process, which is described later with reference to FIG. 4, to control the azimuth angle, the elevation angle, and the magnification of one of their corresponding cameras 25-1 to 25-5 via the LAN. These control devices 24-1 to 24-5 may be collectively referred to as "control device 24". The user inputs the identifier of certain beacon device 21 to certain control device 24, thereby specifying target person 11 to be tracked and imaged by camera 25 corresponding to this control device 24. On the basis of the identifier, each control device 24 acquires the position of corresponding beacon device 21 from position management device 23. Furthermore, each control device 24 receives, via the LAN, imaging data generated by the corresponding one of cameras 25-1 to 25-5. On the basis of the position of beacon device 21 and the imaging data, each control device 24 executes a camera control process, which is described later.

In the camera control process, each control device 24 performs an image analysis on the imaging data to recognize the body or face of the user. For this purpose, each control device 24 has learned human bodies or faces in advance through, for example, deep learning. Each control device 24 may also have individually learned both human bodies and human faces. For the purpose of improving the accuracy of the image analysis, each control device 24 may also learn the bodies or faces of performers in a concert or a play only (such as singers, dancers, or actors).

Each control device 24 may be, for example, a general-purpose personal computer or a dedicated device for controlling camera 25. Each control device 24 executes a program for the camera control process. Each control device 24 includes an input device for the user to input the identifier of beacon device 21 and a display device for displaying imaging data and progress of the camera control process.

Figure 3:
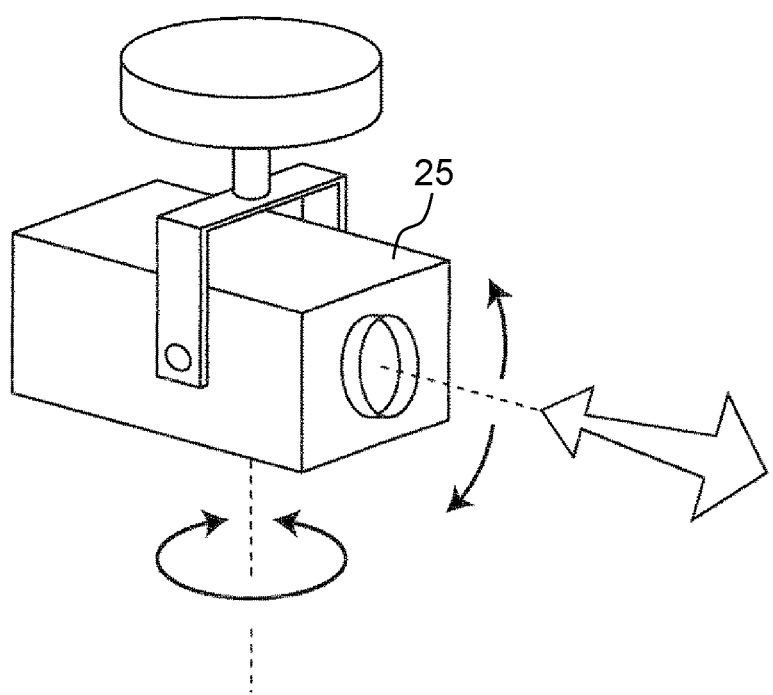
FIG. 3 is a perspective view of camera 25 in FIG. 1.

Cameras 25-1 to 25-5 each image target person 11 at a variable azimuth angle, a variable elevation angle, and a variable magnification. These cameras 25-1 to 25-5 may be collectively referred to as "camera 25". FIG. 3 is a perspective view of camera 25 in FIG. 1. The azimuth angle, the elevation angle, and the magnification of each camera 25 are controlled by corresponding control device 24. The imaging data generated by each camera 25 is sent to SDI switch 26 via the SDI cable. In addition, the imaging data is also sent to corresponding control device 24 via the LAN as described above.

The positions of individual points included in the imaging range of each camera 25 have been calibrated with respect to the coordinates inside concert hall 1. When each control device 24 sets an azimuth angle, an elevation angle, and a magnification on corresponding camera 25, control device 24 recognizes individual points included in the imaging range of camera 25. Here, the position of beacon device 21 is represented by three-dimensional coordinates, while the positions of individual points included in the imaging range of each camera 25 are represented by two-dimensional coordinates. Each control device 24 converts these coordinates into each other on the basis of the position of camera 25, information about the lens of camera 25 (the viewing angle, for example), and the current azimuth angle, elevation angle, and magnification. On the basis of the position of beacon device 21, each control device 24 controls the azimuth angle, the elevation angle, and the magnification of corresponding camera 25 such that target person 11 to be tracked and imaged by camera 25 is included in the imaging range of camera 25.

SDI switch 26 includes five input terminals and three output terminals, and any three of the five input terminals are connected to the output terminal under control of the user.

Display devices 27-1 to 27-3 are attached to, for example, wall 4 at the rear of concert hall 1 as illustrated in FIG. 1. These display devices 27-1 to 27-3 may be collectively referred to as "display device 27". Each display device 27 displays, for example, an enlarged image of corresponding single target person 11 in real time.

The user operates SDI switch 26 to specify which camera 25 is to provide imaging data and which display device 27 is to display the imaging data.

[1-2. Operation]

Figure 4:
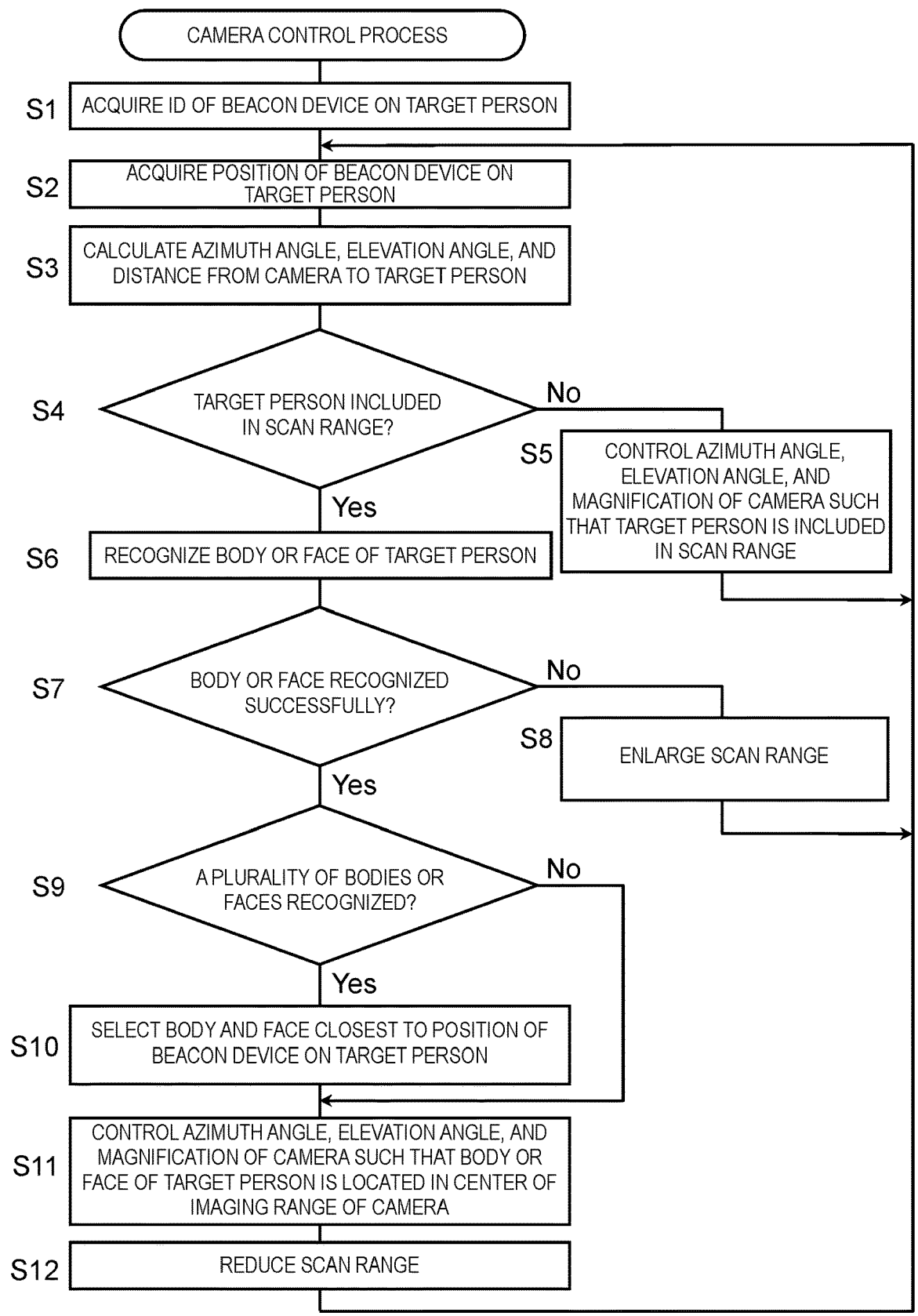
FIG. 4 is a flowchart showing a camera control process executed by control device 24 in FIG. 2.

FIG. 4 is a flowchart showing the camera control process executed by control device 24 in FIG. 2. The flowchart shows a process to be executed by a single control device 24 corresponding to single camera 25 that is to track and image single target person 11.

In step S1 in FIG. 4, control device 24 acquires, from the user, the identifier (ID) of beacon device 21 on target person 11 to be tracked and imaged by camera 25.

In step S2, on the basis of the identifier of beacon device 21, control device 24 acquires the position of beacon device 21 on target person 11 from position management device 23. In step S3, on the basis of the position of beacon device 21 on target person 11, control device 24 calculates the azimuth angle, the elevation angle, and the distance from camera 25 to target person 11.

In step S4, control device 24 determines whether target person 11 is included in a predetermined scan range in the imaging range of camera 25. If the determination is Yes, control device 24 goes to step S6. If the determination is No, control device 24 goes to step S5. The scan range represents a range of pixels to be subjected to an image analysis to be carried out in step S6 later. In step S5, control device 24 controls the azimuth angle, the elevation angle, and the magnification of camera 25 such that target person 11 is included in the scan range.

Figure 5:
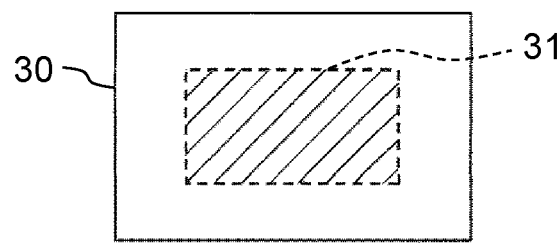
FIG. 5 is a diagram illustrating imaging range 30 of camera 25 in FIG. 1 and scan range 31.
Figure 6:
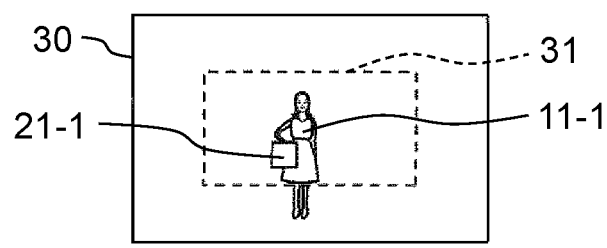
FIG. 6 is a diagram illustrating a state where target person 11-1 is captured by camera 25 in FIG. 1.

FIG. 5 is a diagram illustrating imaging range 30 of camera 25 in FIG. 1 and scan range 31. FIG. 6 is a diagram illustrating a state where target person 11-1 is captured by camera 25 in FIG. 1. FIGS. 5 to 9 are displayed on the display device of control device 24. In step S5 in FIG. 4, control device 24 controls the azimuth angle, the elevation angle, and the magnification of camera 25 such that beacon device 21-1 (that is, target person 11-1) is included in scan range 31, as illustrated in FIG. 6.

During execution of steps S3 to S5, target person 11 may possibly be moving. Therefore, after execution of step S5, control device 24 returns to step S2 and acquires the position of beacon device 21 on target person 11 from position management device 23 again.

Steps S2 to S5 in FIG. 4 represent rough control of camera 25 on the basis of the position of beacon device 21 and are performed prior to an image analysis. On the basis of the azimuth angle, the elevation angle, and the distance calculated in step S3, control device 24 sets a first azimuth angle, a first elevation angle, and a first magnification (also referred to as "first imaging conditions") on camera 25. Control device 24 determines the first imaging conditions such that target person 11 is located in the scan range and that target person 11 is imaged in a first size that is predetermined. Control device 24 causes camera 25 on which the first imaging conditions are set to image target person 11 and to generate imaging data. Here, the user may input information regarding the size of target person 11 to control device 24 in advance. In this case, on the basis of the information regarding the size of target person 11 and the distance from camera 25 to target person 11, control device 24 can determine the first magnification such that target person 11 is imaged in the first size that is predetermined.

In step S6, control device 24 performs an image analysis on the imaging data to recognize the body or face of target person 11. When performing the image analysis on the imaging data, control device 24 analyzes part of the imaging data, the part corresponding to a predetermined scan range in the imaging range of camera 25. In step S7, control device 24 determines whether the recognition of the body or face is successful. If the determination is Yes, control device 24 goes to step S9. If the determination is No, control device 24 goes to step S8. In step S8, control device 24 enlarges the scan range and returns to step S2. Then, in step S6, control device 24 analyzes part of the imaging data, the part corresponding to the enlarged scan range.

Figure 7:
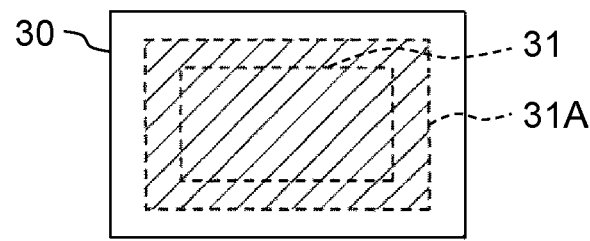
FIG. 7 is a diagram illustrating imaging range 30 of camera 25 in FIG. 1 and enlarged scan range 31A.

FIG. 7 is a diagram illustrating imaging range 30 of camera 25 in FIG. 1 and enlarged scan range 31A. In steps S2 to S5 in FIG. 4, the azimuth angle, the elevation angle, and the magnification of the camera 25 have been controlled on the basis of the position of beacon device 21. Thus, it is considered that the body or face of target person 11 is more likely to be included in scan range 31. However, if the body or face of target person 11 is unrecognizable, it is considered that the body or face of target person 11 can be more reliably recognized by enlarging scan range 31 although the calculation load on control device 24 is increased.

During execution of steps S3, S4, and S6 to S8, target person 11 may possibly be moving. Therefore, after execution of step S8, control device 24 returns to step S2 and acquires the position of beacon device 21 on target person 11 from position management device 23 again.

In step S9, control device 24 determines whether a plurality of bodies or a plurality of faces has been recognized. If the determination is Yes, control device 24 goes to step S10. If the determination is No, control device 24 goes to step S11. In step S10, control device 24 selects the body or face closest to the position of beacon device 21 on target person 11, on the basis of the position of target person 11 as determined by position management device 23.

Figure 8:
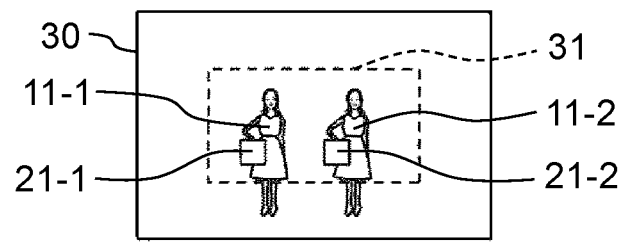
FIG. 8 is a diagram illustrating a state where a plurality of target persons 11-1 and 11-2 is captured by camera 25 in FIG. 1.

FIG. 8 is a diagram illustrating a state where a plurality of target persons 11-1 and 11-2 is captured by camera 25 in FIG. 1. When a plurality of bodies or a plurality of faces is detected through an analysis on the imaging data, control device 24 selects the body or face of target person 11-1 on the basis of the position of beacon device 21-1 (that is, the position of target person 11-1) as determined by position management device 23.

In step S11, control device 24 controls the azimuth angle, the elevation angle, and the magnification of camera 25 such that the body or face of target person 11 is located in the center of the imaging range of camera 25.

Figure 9:
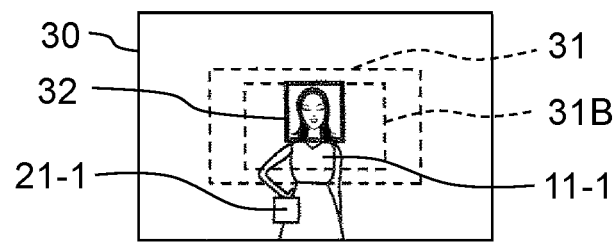
FIG. 9 is a diagram illustrating a state where the face of target person 11-1 is captured by camera 25 in FIG. 1.

FIG. 9 is a diagram illustrating a state where the face of target person 11-1 is captured by camera 25 in FIG. 1. When the face of target person 11-1 is recognized, control device 24 displays bounding block 32 enclosing the recognized face on the display device of control device 24.

In the case where the body or face has been successfully recognized in step S7, control device 24 in step S12 reduces scan range 31 to a size that includes at least the recognized body or face. FIG. 9 shows scan range 31B, which is further reduced from scan range 31 of the original size.

Steps S6 to S12 in FIG. 4 represent fine control on camera 25 performed on the basis of the image analysis. On the basis of the imaging data, or more specifically, on the basis of the position and size of the body or face recognized in step S6, control device 24 sets a second azimuth angle, a second elevation angle, and a second magnification (also referred to as "second imaging conditions") on camera 25. Control device 24 determines the second imaging conditions such that the body or face of target person 11 is located in the center of the imaging range of camera 25 and that the body or face of target person 11 is imaged in a second size that is predetermined. Control device 24 causes camera 25 on which the second imaging conditions are set to image target person 11 and to generate imaging data.

After step S12 in FIG. 4 is executed, the processing returns to step S2. As long as beacon device 21-1 is included in scan range 31 and the body or face of target person 11 is included in scan range 31, control device 24 continues taking images of the target person. On the other hand, when beacon device 21-1 moves out of scan range 31 or when the body or face of target person 11 moves out of scan range 31, control device 24 controls the azimuth angle, the elevation angle, and the magnification of camera 25 to track and image target person 11.

The camera control process in FIG. 4 can be individually executed by each of control devices 24-1 to 24-5 in FIG. 2.

[1-3. Effects and Others]

According to the present exemplary embodiment, the imaging system for imaging at least one movable object 11 includes beacon device 21, position management device 23, camera 25, and control device 24. Beacon device 21 is attached to object 11 and wirelessly transmits a positioning signal. Receiver 22 receives the positioning signal. Position management device 23 determines the position of object 11 on the basis of the positioning signal. Camera 25 images object 11 in a variable direction and at a variable magnification. Control device 24 controls the direction and magnification of camera 25. Control device 24 calculates the direction and distance from camera 25 to object 11 on the basis of the position of object 11 as determined by position management device 23. Control device 24 sets a first direction and a first magnification on camera 25 on the basis of the calculated direction and distance. Control device 24 sets a second direction and a second magnification on camera 25 on the basis of imaging data generated by imaging object 11, the imaging being performed by camera 25 on which the first direction and the first magnification are set.

Therefore, by referring to the position of beacon device 21 and the content of imaging data, object 11 can be tracked and imaged reliably as compared with conventional arts.

According to the present exemplary embodiment, control device 24 determines the first direction and the first magnification such that object 11 is located in a predetermined scan range in the imaging range of camera 25 and that object 11 is imaged in a first size.

Therefore, an appropriate direction and an appropriate magnification can be set on camera 25 even when an image analysis on the imaging data is not done yet.

According to the present exemplary embodiment, object 11 is a human being. Control device 24 analyzes imaging data to recognize the body or face of object 11. Control device 24 determines the second direction and the second magnification such that the body or face of object 11 is located in the center of the imaging range of camera 25 and that the body or face of object 11 is imaged in a second size.

Therefore, an appropriate direction and an appropriate magnification can be set on camera 25 on the basis of the result of the image analysis.

According to the present exemplary embodiment, when a plurality of bodies or a plurality of faces is detected through an analysis on imaging data, control device 24 selects the body or face of object 11 on the basis of the position of object 11 as determined by position management device 23.

Therefore, an appropriate direction and an appropriate magnification can be set on camera 25 on the basis of the position of beacon device 21.

According to the present exemplary embodiment, when analyzing imaging data to recognize the body or face of object 11, control device 24 analyzes part of the imaging data, the part corresponding to a scan range. If the body or face of object 11 is not recognized, control device 24 enlarges the scan range and analyzes part of the imaging data, the part corresponding to the enlarged scan range.

Therefore, although the calculation load is increased in the case where the body or face of object 11 is not recognized, but an increase in the calculation load can be suppressed in the other cases.

According to the present exemplary embodiment, a positioning signal includes an identifier associated with object 11.

Therefore, even when a plurality of objects 11 is present in the imaging range of camera 25 and two or more of objects 11 overlap as seen from camera 25, object 11 of interest can be continuously tracked and imaged.

According to the present exemplary embodiment, an imaging method for imaging at least one movable object 11 is provided. The imaging method includes a step of wirelessly transmitting a positioning signal by means of beacon device 21 attached to object 11. The imaging method includes a step of receiving the positioning signal by means of a plurality of receivers 22 disposed at predetermined positions, and determining the position of object 11 on the basis of the positioning signal. The imaging method includes a step of calculating the direction and distance from camera 25 to object 11 on the basis of the determined position of object 11. The imaging method includes a step of setting a first direction and a first magnification on camera 25 on the basis of the calculated direction and distance. The imaging method includes a step of imaging object 11 to generate imaging data by means of camera 25 on which the first direction and the first magnification are set. The imaging method includes a step of setting a second direction and a second magnification on camera 25 on the basis of the imaging data.

Therefore, by referring to the position of beacon device 21 and the content of imaging data, object 11 can be tracked and imaged reliably as compared with conventional arts.

According to the present exemplary embodiment, a program for controlling an imaging system that images at least one movable object 11 is provided. The imaging system includes beacon device 21 that is attached to object 11 and wirelessly transmits a positioning signal, receiver 22 that receives the positioning signal, position management device 23 that determines the position of object 11 on the basis of the positioning signal, and camera 25 that images object 11 in a variable direction and at a variable magnification. The program includes a step of calculating a direction and a distance from camera 25 to object 11 on the basis of the position of object 11 as determined by position management device 23, a step of setting a first direction and a first magnification on camera 25 on the basis of the calculated direction and distance, and a step of setting a second direction and a second magnification on camera 25 on the basis of the imaging data generated by imaging object 11 by means of camera 25 on which the first direction and the first magnification are set.

Therefore, by referring to the position of beacon device 21 and the content of imaging data, object 11 can be tracked and imaged reliably as compared with conventional arts.

According to the present exemplary embodiment, before performing an image analysis, each control device 24 calculates the distance from camera 25 to beacon device 21 on the basis of the position of beacon device 21, and controls the magnification of camera 25 on the basis of the distance. Therefore, prior to the image analysis, a magnification suitable for the image analysis can be set on camera 25. Furthermore, even when the body or face of the object is not recognized through the image analysis, an apparently suitable magnification is already set on camera 25.

According to the present exemplary embodiment, even when object 11 goes out of the imaging range of camera 25, or even when object 11 is hidden by an obstacle (for example, when object 11 is located at stage wing 3 in FIG. 1), it is possible to continuously track object 11 by referring to the position of beacon device 21. Therefore, when object 11 returns into the imaging range of camera 25, or when object 11 is no longer hidden by the obstacle, camera 25 can immediately re-capture object 11. In addition, since it is possible to find the distance from object 11 to camera 25 by referring to the position of beacon device 21, an appropriate magnification can be estimated, so that zooming operations of camera 25 can be automated. Furthermore, when candidates for a plurality of bodies or a plurality of faces are detected in the imaging data, it is possible to select the body or face closest to the position of target person 11 by referring to the position of beacon device 21.

According to the present exemplary embodiment, each control device 24 may use, as an image analysis engine, an engine in which the body or face of target person 11 is learned in advance through deep learning. As a result, the rate of detecting the body or face in imaging data is improved, and thus camera 25 can be controlled such that object 11 is kept located in the center of the imaging range of camera 25.

According to the present exemplary embodiment, it is made possible to track and image object 11 reliably as compared with conventional arts by combining the position of beacon device 21 with the position of the body or face of object 11 recognized through the image analysis. Importance of the present exemplary embodiment lies not in merely using both of these two types of positions but in how these two types of positions are used, as described below.

First, if the body or face of object 11 is not recognized through the image analysis, each control device 24 controls camera 25 on the basis of the position of beacon device 21 only. On the other hand, when both of the positions are acquired, each control device 24 roughly controls camera 25 on the basis of the position of beacon device 21, and then finely controls camera 25 on the basis of the position of the body or face of object 11 recognized through the image analysis. The position of beacon device 21 can be acquired all the time, but the accuracy of the position is relatively low.

In contrast, the image analysis may fail to recognize the body or face of object 11, but the position of the body or face, if recognized, has a higher degree of accuracy. Therefore, combining these two types of positions makes it possible to track and image object 11 reliably as compared with conventional arts.

In addition, when both of the positions are acquired and a plurality of bodies or a plurality of faces is detected through the image analysis, each control device 24 can select, on the basis of the position of beacon device 21, the body or face that may belong to target person 11 with the highest probability.

Furthermore, since the distance from camera 25 to object 11 is found on the basis of the position of beacon device 21, it is made possible to estimate in what size object 11 appears in the imaging data. On the basis of the size of object 11, the image analysis can be performed more accurately and more efficiently.

Other Exemplary Embodiments

As seen above, the exemplary embodiment has been described as an example of the technology disclosed in the present application. However, the technology in the present disclosure is not limited thereto but can be applied to exemplary embodiments in which changes, replacements, additions, omissions, and the like are made as appropriate. Furthermore, the individual components described in the foregoing exemplary embodiment can be combined to provide a new exemplary embodiment.

Thus, the following shows other exemplary embodiments as examples.

In the above exemplary embodiment, beacon device 21 that transmits a beacon signal has been described as an example of the transmitter that transmits a positioning signal. However, the transmitter is not limited to beacon device 21 that transmits a beacon signal. The transmitter may be a wireless transmitter that transmits any other wireless signal than beacon signals as long as the position of corresponding target person 11 can be determined.

In the above exemplary embodiment, receivers 22-1 to 22-3 and position management device 23 have been described as examples of a positioning device. However, the positioning device may be any other device including receivers, a number of which is different from above, as long as the position of the corresponding target person 11 can be determined. Furthermore, position management device 23 may be integrated into one of control devices 24. In the above-described exemplary embodiment, position management device 23 determines the position of beacon device 21 in a three-dimensional coordinate system. However, if movement of object 11 is limited, position management device 23 may determine the position in a two-dimensional space or the position in a one-dimensional space.

In the above exemplary embodiment, control devices 24-1 to 24-5 have been described as examples of a control device. However, the control device may be any other device as long as the device can control cameras 25-1 to 25-5. In the example in FIG. 2, single control device 24 is provided for single camera 25, but single control device 24 may control a plurality of cameras 25.

In the above exemplary embodiment, cameras 25-1 to 25-5 each having a variable azimuth angle, a variable elevation angle, and a variable magnification have been described as an example of an imaging device. However, the imaging device may be any other device as long as the device has at least either one (a variable direction) of a variable azimuth angle and a variable elevation angle and the device can image object 11 at a variable magnification. The imaging device may further be configured to be movable in order to take images of object 11 from various positions.

In the above exemplary embodiment, the imaging data generated by camera 25 is displayed on display device 27 in real time. However, alternatively or additionally, the imaging data may be recorded on control device 24 or on any other recording device.

According to the above exemplary embodiment, when a plurality of bodies or a plurality of faces is detected, the body or face closest to the position of beacon device 21 on target person 11 is selected, and camera 25 is controlled such that the body or face of target person 11 is located in the center of the imaging range of camera 25 (steps S9 to S11). However, there is a possibility that the body or face of target person 11 cannot be correctly selected from the plurality of bodies or the plurality of faces depending on the resolution for determining the position of beacon device 21. For this reason, when a plurality of bodies or a plurality of faces is detected, control device 24 may generate a bounding block representing the smallest rectangle that encloses all of these bodies or faces, and then control device 24 may control camera 25 such that the center of the bounding block is located in the center of the imaging range of camera 25.

In the above exemplary embodiment, the imaging system is installed in concert hall 1. However, the imaging system may be installed in, for example, a stadium for sports or races. In this case, object 11, which may be a human being, a vehicle, an animal, and so on, is tracked and imaged.

As seen above, the exemplary embodiments have been described as examples of the technology according to the present disclosure. For this purpose, the accompanying drawings and the detailed description have been provided.

Therefore, the components described in the accompanying drawings and the detailed description may include not only the components essential for solving the problems but also other components that are not essential for solving the problems but are included in order to illustrate the above-described technology. Therefore, these nonessential components should not be regarded as essential simply because these nonessential components are described in the accompanying drawings and the detailed description.

Furthermore, the above-described exemplary embodiments are intended to exemplify the technology according to the present disclosure, and thus various changes, replacements, additions, omissions, and the like can be made to these exemplary embodiments within the scope of the claims or equivalents of the claims.

INDUSTRIAL APPLICABILITY

According to an aspect of the present disclosure, human-like camerawork can be achieved to save labor for imaging by combining three-dimensional position management employing a power-saving beacon device with high-precision image recognition technology (deep learning, for example). As a result, a new video market for live entertainment can be created.

The imaging system according to an aspect of the present disclosure can be used as, for example, an imaging system for a broadcast studio. In addition, the imaging system according to an aspect of the present disclosure can be used as a real-time video transmission system for live entertainment.

REFERENCE MARKS IN THE DRAWINGS 1 concert hall
2 stage
3 stage wing
4 wall
5 console
11-1 to 11-3 target person (object)
21-1 to 21-3 beacon device
22-1 to 22-3 receiver
23 position management device
24-1 to 24-5 control device
25-1 to 25-5 camera
26 serial digital interface (SDI) switch
27-1 to 27-3 display device
28 network hub
30 imaging range
31, 31A, 31B scan range
32 bounding block

The invention claimed is:

1. An imaging system that images an object being movable, the imaging system comprising:
 a transmitter that is attached to the object and wirelessly transmits a positioning signal;
 a positioning device that receives the positioning signal and determines a position of the object based on the positioning signal;
 an imaging device that images the object in a variable direction and at a variable magnification; and
 a control device that controls the variable direction and the variable magnification of the imaging device, wherein
 the control device calculates a direction and a distance from the imaging device to the object based on the position of the object, the position being determined by the positioning device,
 the control device sets a first direction and a first magnification on the imaging device based on the direction and the distance that have been calculated, and
 the control device sets a second direction and a second magnification on the imaging device based on imaging data generated by imaging the object, the imaging data being generated by the imaging device on which the first direction and the first magnification are set.

2. The imaging system according to claim 1, wherein the control device sets the first direction and the first magnification in such a manner that the object is located in a scan range in an imaging range of the imaging device, the scan range being predetermined, and that the object is imaged in a first size.

3. The imaging system according to claim 2, wherein
 the object is a human being,
 the control device analyzes the imaging data to recognize a body or a face of the object, and
 the control device sets the second direction and the second magnification in such a manner that a center of the body or the face of the object is located in a center of the imaging range of the imaging device and that the body or the face of the object is imaged in a second size.

4. The imaging system according to claim 3, wherein when the control device analyzes the imaging data to detect a plurality of bodies or a plurality of faces, the control device selects the body or the face of the object based on the position of the object, the position being determined by the positioning device.

5. The imaging system according to claim 3, wherein when the body or the face of the object is not recognized by analyzing part of the imaging data, the part corresponding to the scan range, the control device enlarges the scan range and analyses part of the imaging data, the part corresponding to the scan range that has been enlarged, to recognize the body or the face of the object.

6. The imaging system according to any one of claim 1, wherein the positioning signal includes an identifier associated with the object.

7. An imaging method for imaging an object being movable, the imaging method comprising:
  wirelessly transmitting a positional signal, the wirelessly transmitting being performed by a transmitter attached to the object;
  receiving the positioning signal and determining a position of the object based on the positioning signal, the receiving being performed by a plurality of receivers disposed at predetermined positions;
  calculating a direction and a distance from an imaging device to the object based on the position that has been determined, of the object;
  setting a first direction and a first magnification on the imaging device based on the direction and the distance that have been calculated;
  imaging the object to generate imaging data, the imaging data being generated by the imaging device on which the first direction and the first magnification are set; and
  setting a second direction and a second magnification on the imaging device based on the imaging data.

8. A non-transitory recording medium storing a program for controlling an imaging system that images an object being movable, the imaging system including:
  a transmitter that is attached to the object and wirelessly transmits a positioning signal;
  a positioning device that receives the positioning signal and determines a position of the object based on the positioning signal; and
  an imaging device that images the object in a variable direction and at a variable magnification,
  the program comprising steps of:
  calculating a direction and a distance from the imaging device to the object based on the position of the object, the position being determined by the positioning device;
  setting a first direction and a first magnification on the imaging device based on the direction and the distance that have been calculated; and
  setting a second direction and a second magnification on the imaging device based on imaging data generated by imaging the object, the imaging data being generated by the imaging device on which the first direction and the first magnification are set.

* * * * *